Patented Oct. 29, 1946

2,410,079

UNITED STATES PATENT OFFICE 2,410,079

PRESSURE-SENSITIVE ADHESIVE

Waldo Kellgren, St. Paul, Minn., assignor to Minnesota Mining & Manufacturing Company, St. Paul, Minn., a corporation of Delaware No Drawing. Application September 19, 1941, Serial No. 411,590

14 Claims. (Cl. 260—793)

This invention relates to rubber-base adhesives of the pressure-sensitive type—that is, to adhesives which are normally and permanently tacky in solid phase without the need of activation by use of solvents or heat. The term "pressure-sensitive adhesive" has commonly been understood to include the attribute of high cohesiveness, such adhesives preferably being more cohesive than adhesive so that sheet material coated therewith can be applied to a smooth surface and afterwards stripped off without adhesive transfer or offsetting taking place, in contradistinction to mere sticky masses which are soft or liquid (such as liquid glue). Pressure-sensitive adhesive tapes can be unwound from rolls thereof without offsetting of adhesive, and can be removably applied to surfaces by mere application of moderate pressure, and without the adhesive coming off on the fingers, when the tacky adhesive is more cohesive than adhesive.

Pressure-sensitive adhesives, particularly those employed in adhesive tapes, have commonly been formed of a combination of a rubbery base (which gives a tough and flexible body) and an admixed tack-producing material (such as rosin or ester gum), so as to secure in combination the properties of high-cohesiveness and tackiness.

Rubber can be masticated or degraded so as to secure tackiness. Ordinary milling for an extended period causes a surface tackiness which is too mild and lacking in "tooth" to be adequate. Severe mastication or breaking down will destroy the nerve and produce a pasty or fluid condition so as to result in a sticky mass, but such mass will be less cohesive than adhesive. Adequate tackiness cannot be obtained without loss of the desired internal cohesion, hence the use of admixed tack-producing agents.

I have now discovered that it is possible to transform rubber to a normally tacky and pressure-sensitive adhesive form usable as a coating for adhesive tapes, being more cohesive than adhesive while yet possessing an aggressive tackiness, without the need of resorting to admixed tack-producing materials. I have further discovered that this type of pressure-sensitive adhesive possesses desirable properties not found in the prior art rubber-resin adhesives. Among such special properties are the following of particular note: a high resistance to ageing, a substantial absence of thermo-plasticity and freedom from softening up at elevated temperatures, and a high resistance to mineral oils. These and other features will be indicated more fully in the following description.

Briefly stated, my discovery is that the above-mentioned transformation of rubber can be effected by breaking down rubber to a pasty or liquid state and then vulcanizing it until it is more cohesive than adhesive but still tacky, and stably so.

It is convenient to consider the transformation in terms of three stages indicated as follows:

*A Stage.*—The rubber is a soluble, tough, elastic, thermoplastic mass having little or no tackiness. This represents the initial raw rubber and also the rubber under treatment before it has been brought to the next state.

*B Stage.*—The rubber is a soluble, sticky, inelastic, pasty or fluid mass having less cohesiveness than adhesiveness.

*C Stage.*—The rubber, as the result of vulcanization, is insoluble or relatively insoluble compared to raw rubber, and is an elastic, gummy, stably tacky mass having greater cohesiveness than adhesiveness and is substantially non-thermoplastic. This is the desired pressure-sensitive adhesive product.

Vulcanization in the broad sense is a treatment of rubber which brings about such changes in its physical properties as greater strength, less surface tackiness, greater apparent elasticity, less thermoplasticity and lower solubility. Consistently with broad usage, the term "vulcanization" as used in this specification is not limited to sulfur treatment of rubber but is to be understood as generically embracing any form of rubber treatment which can transform rubber from the aforesaid B Stage condition to a C Stage condition.

"*Thumb test.*"—This test provides a simple and sufficiently accurate practical criterion as to whether a mass of rubber, undergoing transformation, has been brought from A Stage to B Stage (prior to vulcanization) or from B Stage to C Stage (after vulcanization). The test is made as follows: A small mass of the rubber is taken between thumb and forefinger, which are then alternately separated and brought together several times. If the rubber is in A Stage or C Stage state, it will transfer from finger to finger and exhibit elasticity and stretchiness but will not split and stick to the fingers. If in C Stage it may be quite tacky, yet will still be so cohesive that it will pull clean from the fingers. However, if the rubber is in B Stage state, it will stick to both fingers and can be drawn out until it finally splits, showing that the rubber is in a state of degradation such that it is less cohesive than adhesive. The rubber will also show little or no sign of having nerve and will have a high degree of tooth. In making this test, the rubber should first be allowed to stand for 24 hours if in a recently worked or heated condition so that it will be at room temperature and will have regained whatever nerve it can.

This thumb test shows when rubber has been broken down to a "pasty" state. Further breaking down will make the rubber still more plastic (reduce cohesiveness) and more sticky or tacky, until finally an advanced B Stage state may be reached in which the rubber is a sticky liquid which can even be poured at room temperature. The term "liquefied rubber" will be used as sub-generic to "pasty" or "B Stage" and indicates a degree of break-down sufficient to permit of pouring the rubber when it is examined at a temperature of 212° F. or lower.

The ordinary milling of rubber, even when extended for several hours, falls far short of transforming it to a B Stage condition. The present invention involves a treatment and changes of state which are far removed from the mere milling and vulcanization of rubber. To further illustrate the drastic nature of the break-down necessary to produce even a B Stage or pasty condition near the boundary, the following data is noted: Latex crepe was milled for 10 minutes and a portion, after standing 24 hours, was tested on a Scott plastometer, which gave a reading of 90-95%. Another sample was subjected to milling for 2 hours, allowed to stand 24 hours, and twice remilled for 2 hours using the same cycle; and a portion of the product, after standing 24 hours, gave a reading of 40%. Using the breakdown method described hereafter, rubber which had just reached the pasty state by the thumb test gave a plastometer reading of under 5%, the precise comparable value not being obtainable because of the highly plastic condition.

In explanation of the properties of C Stage rubber—the pressure-sensitive adhesive product which is more cohesive than adhesive—it is my theory that it has a gel structure comprised of a gel matrix formed of vulcanized rubber molecules, which provides a cohesive and elastic body or framework, within which is dispersed a sol phase formed of rubber which is still in a pasty or plastic state. If this is the case, and various observations tend to bear it out in my opinion, then the transformation of the rubber has resulted in creating and retaining in situ a plastic and tacky rubber phase which constitutes the "tack-producing" agent for the rubbery body of the adhesive which is formed upon vulcanization. The greater the degree of vulcanization, the smaller the proportion of the tack-producing rubber phase which remains, until finally the mass will no longer be pressure-sensitive.

The breaking down of the rubber, to reach the B Stage or pasty state, can be accomplished by extended mechanical working in the presence of heat and air (oxygen). While not at all essential, an oxidation catalyst is preferably used to hasten the process and save power. Oxidation appears to play a necessary part in this process of breaking down. By using higher temperatures, the rubber can be "melted" or liquefied without mechanical working. Apparently oxidation plays a part even at such high temperatures, possibly even an occluded trace of oxygen being enough, but I am not certain whether an oxidative breaking down is necessarily involved in such cases.

Examples of suitable oxidation catalysts or peptizing agents are "RPA No. 1" (zinc chloride double salt of phenyl hydrazine), "RPA No. 2" (33⅓% naphthyl-beta-mercaptan and 66⅔% inert waxy hydrocarbon), "RPA No. 3" (36½% xylyl-mercaptan and 63½% inert liquid hydrocarbon), and "RPA No. 4" (a mixture of aryl mercaptans). Only a small amount, such as 0.25 to 5% of the rubber, is needed to produce marked results.

A preferred method of vulcanization involves avoidance of the use of free sulfur, by using instead a "self-vulcanizing organic accelerator," by which is meant that type of organic accelerator which gives a good cure (in the presence of an activator, such as zinc oxide) to sulfur-free rubber stocks. The preferred kind is represented by the thiuram-polysulfide accelerators, illustrated by "Tetrone-A" (dipentamethylene - thiuram-tetrasulfide) and "Tuads" (tetramethyl-thiuram-disulfide). These "accelerators" apparently liberate a nascent form of sulfur during the vulcanization process, which form of sulfur immediately combines with the rubber and produces vulcanization with use of temperature-time combinations which do not damage, or preclude obtaining, the desired product. Furthermore, there is no residual uncombined sulfur left over and the adhesive is stably tacky, that is, does not lose tack on long ageing, as would be the case if ordinary sulfur vulcanization methods were used which cause progressive "after-vulcanization." The proportion of "Tetrone-A" may range from about 0.2 to 1.5 parts by weight per 100 parts of rubber, depending upon the degree of rubber break-down and upon the desired degree of tackiness of the product. Further control of tackiness can be obtained by varying the temperature and time factors of the vulcanization process. About twice as much "Tuads" are needed to produce equivalent results. When zinc oxide is used as the activator, about 1 part by weight per 100 parts rubber is sufficient to activate, but better results will be obtained by using 5 parts, and an even greater amount can be used in which case the zinc oxide will also provide a substantial reinforcing and firming action in the product. Various other zinc compounds, for example, can be used as activators (such as zinc stearate).

It is possible to employ free sulfur by using a small amount and employing a very powerful ultra-accelerator of a kind capable of largely preventing the presence of free sulfur in the product and keeping after-vulcanization down to a small degree. Such ultra-accelerator should preferably be of a type that does not yield sulfur.

It is also possible to employ selenium as a vulcanizing agent, preferably in combination with a thiurampolysulfide type accelerator.

It is also possible to employe an oil-soluble heat-advancing rubber-reactive phenol-aldehyde type resin, employed in conjunction with a catalyst such as zinc oxide, which functions upon heating to set up the rubber mass from B Stage to C Stage.

Various types of modifiers and fillers can be incorporated. Thus zinc oxide, whiting, clay and carbon black can be incorporated as reinforcing pigments or fillers. Colored pigments can be added. Plasticizers and softeners may be utilized.

As previously mentioned, the use of tack-producing resins is not required. However, such resins may be included, being preferably incorporated into the rubber when the latter is in B Stage and before vulcanization. Generally speaking, it is best to use a non-acidic or low-acid type of tack-producing resin so as to minimize interference with the vulcanization process, such as low-acid type ester gum (which may or may not be hydrogenated) and "Nevillite resin" (a hydrogenated indene type resin). In such case the adhesive product contains two types of tack-producing agents: The admixed resin and the unconverted pasty or liquid rubber, each of which contributes certain special characteristics. Without the use of admixed resin, the pressure-sensitive adhesive has a "soft" grab, by which it is meant that the adhesive is quite stretchy and pulls away gradually from a surface from which it is being stripped, acting as a shock absorber to take up the stripping force, so that adhesive tape can be pulled from a paper surface without splitting the paper. The addition of resin makes for a more "vicious" grab, the adhesive being made less stretchy. The resin can be used in proportions up to equal parts resin and rubber or more, depending upon the degree of rubber break-down and extent of vulcanization.

Example 1

| | Parts |
|---|---|
| Latex crepe | 100 |
| Zinc oxide | 5 |
| RPA No. 2 (peptizing agent) | 1 |
| Oleum spirits | 212 |
| Tetrone-A (vulcanizing agent) | 0.2 to 1.0 |

The RPA No. 2 is a waxy material composed of 33⅓% naphthyl-beta-mercaptan and 66⅔% inert hydrocarbon diluent (the latter facilitating weighing and handling). The oleum spirits is a volatile petroleum hydrocarbon solvent. The Tetrone-A is dipentamethylene-thiuram-tetrasulfide.

The latex crepe is milled for 10 minutes and the RPA No. 2 and zinc oxide are added and combined with the rubber on the mill with continued milling for 1 hour. 20# stem pressure is suitable, giving a mill temperature of about 225° F. By this time the plasticity will have increased so as to give a reading of about 10% on the Scott plastometer (the test sample being allowed to stand 24 hours at room temperature before measuring). The plastic mass is removed from the mill and placed in an internal mixer (such as a Baker Perkins Mogul mixer) and mixed for 2 hours with 20# steam in the jacket. The rubber will by now have been broken down to a pasty state (as determined by the previously described thumb test) and so be within B Stage.

The composition is now cooled to room temperature by running cooling water through the mixer jacket and the oleum spirits solvent is added with continued mixing until the rubber is dissolved. The vulcanizing agent may then be incorporated, or this may be done at a later time if the adhesive product (Stage C) is not to be made until later. The vulcanizing agent will cause gelling within about two weeks at room temperature, hence should be added reasonably soon before use.

The rubber solution, with vulcanizing agent incorporated, is spread or coated upon a sheet backing (such as paper or cloth) in making adhesive sheeting, or upon such other surface as is desired, followed by drying at 150° F. and then by baking for 1 hour at 260° F. The heating drives off the solvent and converts the rubber to C Stage—that is, to a pressure-sensitive adhesive that is more cohesive than adhesive. The properties will depend upon the proportion of vulcanizing agent used, and may be further modified by change of the vulcanization temperature and time factors; the longer the time and the higher the temperature, the lower the degree of tackiness. With 0.2 to 0.5 parts Tetrone-A per 100 parts of rubber, using the aforesaid temperature-time factors, the tacky adhesive will be toothy. With 0.6 to 1.0 parts Tetrone-A, there will be an absence of tooth owing to the firmness of the rubber and in the upper extreme the adhesive will have a very mild degree of tackiness. This example illustrates a case in which the B Stage rubber is pasty but has not been so drastically broken down as to be liquefied.

Example 2

| | Parts |
|---|---|
| Latex crepe | 100 |
| Zinc oxide | 5 |
| RPA No. 2 | 1 |
| Tetrone-A | 0.5 to 1.5 |
| Antioxidant | 1 |

The rubber is milled for 1 hour, using 20# steam pressure, the zinc oxide and RPA No. 2 being worked in at the beginning, following which the plastic rubber mass is transferred to an internal mixer, heated with 50# steam in the jacket, and mixed for 16 hours, followed by cooling. If the RPA No. 2, or other peptizer, were not used, several additional hours of mixing time would be required and there would be a greater power consumption per unit of time. This treatment produces liquefied rubber, the rubber pouring at 150° F. Owing to the highly plastic nature of the rubber, even at room temperature, it can be readily coated upon a base and can be conveniently calendered upon sheet material. But if desired, a solvent (such as oleum spirits or heptane) may be incorporated to make for a more fluid coating composition.

The antioxidant is normally added after the rubber has been cooled, and may be added with the vulcanizing agent. An illustrative rubber antioxidant is aldol alpha naphthylamine ("Agerite white").

The vulcanizing agent is incorporated shortly before vulcanization in order to avoid gelling which would result upon long standing of the mixture. However, if gelling occurs, the mass can be broken up to plastic state by use of an internal mixer. Owing to the more highly broken down state of the rubber, a higher proportion of vulcanizing agent must be used than in the preceding example in order to transform the rubber to C Stage. This combination of greater break-down and resultant increased vulcanization makes for a greater ageing life for any particular degree of tackiness. Heating at 260° F. for 45 minutes to 1 hour is sufficient to produce vulcanization; the degree of tackiness being controllable through variation of these temperature and time factors.

Example 3

Smoked sheets or latex crepe rubber is melted by heating for 5 hours at 450–500° F., and will then be in a liquid condition even after cooling to room temperature. The resultant liquefied rubber may then, when desired, be converted to C Stage (pressure-sensitive adhesive product) by adding 0.5 to 1.5% of Tetrone-A and 5% zinc oxide and heating for 1 hour at 260° F. The rubber can be vulcanized in the manner described in the preceding example.

Example 4

This example illustrates the use of sulfur and an ultra-accelerator to produce vulcanization of B Stage rubber, such as that produced by the break-down method described in Example 2. To the rubber, which includes 5 parts zinc oxide per 100 parts rubber there is mixed (after cooling) a vulcanizer mixture according to any of the following illustrations (proportions being relative to 100 parts rubber), followed by vulcanization at the temperature and period noted.

(a)

| | Per cent |
|---|---|
| Dibutyl xanthic disulfide (C-P-B) | 2 |
| Dibenzylamine (D-B-A) | 2 |
| Sulfur | 0.23 |

Vulcanized at 212° F. for 12–20 minutes.

(b)

| | Per cent |
|---|---|
| "Tepidone" | 2 |
| Diphenyl guanidine (D. P. G.) | 1 |
| Sulfur | 0.23 |

Vulcanized at 200° F. for 16 minutes.

(c)

| | Per cent |
|---|---|
| "Acrin" (a condensation product of hexa-methylenetetramine, benzyl - mercapto-benzothiazole) | 2 |
| Diphenyl guanidine (D. P. G.) | 1 |
| Sulfur | 0.25 |

Vulcanized at 225° F. for 16 minutes.

The foregoing combinations of ultra-accelerators and small percentage of sulfur, with the zinc oxide activator, have been found to make possible a vulcanized pressure-sensitive adhesive which is stably tacky, there being not over about 25% tack loss in 1 year of standing at room temperature. Apparently under the conditions employed, there is little free sulfur remaining in the adhesive product to cause after-vulcanization and tack loss. This specific technique should not be confused with ordinary free-sulfur vulcanization which, even when accelerators are employed, would cause the product to contain uncombined sulfur resulting in rapid loss of tack.

*Example 5*

The formula and break-down procedure are the same as in Example 2. When the break-down treatment in the internal mixer is completed, the vulcanizing agent is added and the temperature increased by raising the steam pressure to 60#, followed by continued mixing for 1 hour or somewhat longer, thereby vulcanizing the rubber sufficiently to transform the rubber to C Stage. Cooling water is introduced into the jacket and the mix brought down to about 100° F. and, with continued mixing, a solvent (such as oleum spirits) is very gradually added in sufficient total amount to produce a liquid of suitable viscosity for spreading or coating. Notwithstanding the partially vulcanized state of the rubber, this technique yields a smooth solution or dispersion. Upon standing it may gel, but this can be broken up, and the fluid state restored, by mixing.

This adhesive solution or dispersion can be readily coated upon any desired base or backing and, upon evaporation of the solvent, there will be left a pressure-sensitive adhesive which is more cohesive than adhesive.

Water dispersed adhesives can also be prepared. The liquefied rubber, after incorporation of the vulcanizing agent (such as Tetrone-A), is dispersed in water, using a suitable emulsifying agent (such as a soap formed in situ from potassium hydroxide and rosin), following which the dispersion is subjected to a temperature of 150° F. for 3 days, being kept in a tightly closed vessel to prevent loss of the water; or a higher temperature and shorter time can be employed by heating the dispersion in a pressure vessel.

*Example 6*

The B Stage or liquefied rubber, which may include a volatile solvent to further increase fluidity, may be utilized in preparing a unified fabric backing for pressure-sensitive adhesive tape. In this case the factors affecting the degree of vulcanization may be adjusted so that the unified fabric will be non-tacky or substantially so, through control of the proportion of vulcanization agent and temperature and time employed in the vulcanization process.

Thus the broken-down rubber prepared as described in Example 2 may be cooled in the mixer and 1 part antioxidant, 2 parts Tetrone-A and 50 parts oleum spirits (per 100 parts rubber) are added with continued mixing to secure a smooth solution. A porous fibrous fabric, such as kraft towelling paper, cotton batting, cloth, glass cloth, or other suitable sheet material to be used as a tape backing, is then impregnated with the solution, followed by heating at 150° F. sufficient to largely drive off the solvent, after which the impregnated fabric may be baked at 260° F. for an hour or more to produce a unified fabric which is substantially non-tacky. The drastic breakdown of the rubber makes it more penetrative and less solvent is needed, thereby making it possible to introduce a large proportion of rubber solids into the fabric body. This is of particular importance in treating paper. The subsequent vulcanization of the rubber in situ produces a firm and cohesive condition.

The unified fabric may then be coated on one or both sides with the composition of Example 2, for example, with further heating at 260° F. for 45 minutes to vulcanize the coating to C Stage, resulting in pressure-sensitive adhesive tape after the sheet has been slit into strips of desired width. Where the backing is to be coated with pressure-sensitive adhesive on one side only, the reverse side may be sized with shellac. The shellac may be conveniently applied in an alcohol solution before vulcanization treatment. This back-sizing provides a surface for which the pressure-sensitive adhesive has a limited affinity and thus facilitates the unwinding of adhesive tape from rolls thereof.

Double-coated pressure-sensitive adhesive sheets or tapes can also be made in which the pressure-sensitive adhesive itself is employed for unification of a fibrous paper or other fabric which carries the adhesive coatings. Thus the composition of Example 2, to which 50 parts oleum spirits per 100 parts of rubber has been incorporated, may be used to saturate and coat on both sides a thin and porous rope tissue paper, followed by heating to drive off the solvent and vulcanize the rubber to C Stage. Illustrative method and means for impregnating and double-coating the tissue will be found described in my U. S. Patent No. 2,206,899, issued July 9, 1940.

A porous backing may also be coated on one side with B Stage rubber which is vulcanized to a substantially non-tacky state, and on the reverse side with B Stage rubber which is vulcanized only to the tacky C Stage; the penetration from opposite sides being adequate to unify the backing.

It has previously been mentioned that the present invention makes possible the production of rubber-base pressure-sensitive adhesives which are non-thermoplastic. Thus adhesive tape having a pressure-sensitive adhesive coating prepared as described in Example 2 may be heated up to about 300° F. without any sign of the adhesive softening or melting. Above this there is a critical point at which the adhesive will liquefy and will not revert upon cooling. The regular prior art type of rubber-base pressure-sensitive adhesive (which is a blend of raw rubber and resin such as rosin or ester gum and may contain a pigment or filler such as zinc oxide) usually melts in the range of 150–250° F.—gradually softening as the temperature is raised up to a point in the range where it melts and becomes "soupy"—but upon cooling regains its normal state if the heating has not been excessive. This behavior of the prior art type of adhesive is due to the fact that the unvulcanized rubber and the resin are thermoplastic. The present type of adhesive therefore has advantage where it is likely or certain to be subjected to elevated temperatures up to about 300° F. and it is desired that the adhesive maintain its cohesive strength and not soften up.

The present type of adhesive also has the advantage over the prior art type of rubber-base adhesive in having a much longer ageing life, the vulcanization of the rubber, and the absence of resin (when the latter is not used), making the adhesive more resistant to the deteriorating effect of prolonged exposure to air, heat and sunlight.

The present adhesive is also much more resistant to the effects of liquids and vapors of a kind which dissolve or swell unvulcanized rubber, such as petroleum products. It can thus be employed to advantage on adhesive tapes which are exposed to petroleum oils or lubricants.

For these reasons, the present adhesive may be employed to advantage in the making of electrical tapes.

The present type of adhesive can be formed on sheet materials without using a solvent. Thus the composition of Example 2 can be calendered or spread upon a sheet backing without employment of a solvent vehicle, because of the highly plastic state of the rubber, followed by vulcanization to form the C Stage pressure-sensitive adhesive in situ upon the backing. Since there is no solvent to be driven off, the resultant adhesive coating will be denser and more continuous, and of course there will be an economic saving and avoidance of the fire hazards that attend use of rubber solvents.

Having described various embodiments of my invention for the purposes of illustration, but not of limitation, what I claim is as follows:

1. A method of transforming rubber to a normally and stably tacky and pressure-sensitive adhesive form usable as a coating for adhesive sheets or tapes, which comprises breaking down the rubber until it is in a pasty and sticky condition and afterwards vulcanizing the rubber until it is more cohesive than adhesive but still tacky, the vulcanizing being substantially completed at this stage such that after-vulcanization and tack loss will not occur.

2. A method of transforming rubber to a normally and stably tacky and pressure-sensitive adhesive state which comprises subjecting the rubber to an oxidative breaking down by prolonged heating and mechanical working in the presence of air until the rubber is pasty and sticky, being then less cohesive than adhesive, and afterwards vulcanizing the rubber until it is more cohesive than adhesive but still tacky, the vulcanizing being substantially completed at this stage such that after-vulcanization and tack loss will not occur.

3. The method of claim 2 wherein an oxidation catalyst is mixed with the rubber to facilitate the breaking down process.

4. The method of claim 1 wherein the use of free sulfur is avoided in vulcanizing the rubber.

5. A method of transforming rubber to a normally and stably tacky and pressure-sensitive adhesive form which comprises breaking down the rubber to a pasty and sticky condition and afterwards vulcanizing the rubber, until it is more cohesive than adhesive but still tacky, by heating in admixture with a self-vulcanizing organic accelerator, the product being substantially free from after-vulcanization and tack loss at room temperatures.

6. The method of claim 5 wherein the self-vulcanizing organic accelerator is of the thiuram-polysulfide type.

7. A method of making a normally and stably tacky and pressure-sensitive adhesive which comprises breaking down rubber to a liquefied and tacky state and afterwards vulcanizing the rubber sufficiently to render the mass thereof more cohesive than adhesive but insufficiently to destroy its tackiness, the means of vulcanization being such as will not cause substantial after-vulcanization and tack loss.

8. A normally and stably tacky and pressure-sensitive adhesive primarily consisting of vulcanized pasty rubber which is stably tacky and more cohesive than adhesive, said vulcanized rubber being substantially non-thermoplastic.

9. A normally and stably tacky and pressure-sensitive adhesive formed of vulcanized liquefied rubber which is stably tacky and more cohesive than adhesive, and which does not contain free sulfur and is not subject to after-vulcanization at room temperatures, said adhesive being substantially non-thermoplastic.

10. A normally and stably tacky and pressure-sensitive adhesive formed of rubber which has been vulcanized from a pasty and sticky condition by means of a thiuram-polysulfide type of self-vulcanizing organic accelerator to a tacky state in which it is more cohesive than adhesive.

11. An adhesive composition comprised of a volatile vehicle in which is dispersed as the main adhesive a vulcanized pasty rubber which has been transformed from a pasty and sticky state to a state in which it is more cohesive than adhesive but still tacky, the vulcanized rubber being stably tacky.

12. In combination in an adhesive sheet or tape, a normally and stably tacky and pressure-sensitive adhesive coating formed of vulcanized pasty rubber which is stably tacky and more cohesive than adhesive, said vulcanized rubber being substantially non-thermoplastic.

13. A method of producing a stably tacky pressure-sensitive adhesive useful in making adhesive tapes, comprising vulcanizing a sticky polymerizable compound which is less cohesive than adhesive, to increase internal cohesiveness strength to a stage at which the product is more cohesive than adhesive but still tacky, the vulcanizing being substantially completed at this stage such that after-vulcanization and tack-loss will not occur.

14. A pressure-sensitive adhesive sheet or tape characterized by having a normally and stably tacky adhesive coating which is more cohesive than adhesive and formed of the vulcanized compound made by the method of claim 13.

WALDO KELLGREN.